No. 863,420. PATENTED AUG. 13, 1907.
E. B. McKENNA.
BRAKING CONSTRUCTION.
APPLICATION FILED DEC. 3, 1906.

WITNESSES

INVENTOR
E. B. McKenna
BY
ATTORNEYS

UNITED STATES PATENT OFFICE.

EDMUND BOURKE McKENNA, OF BUFFALO, NEW YORK.

BRAKING CONSTRUCTION.

No. 863,420.  Specification of Letters Patent.  Patented Aug. 13, 1907.

Application filed December 3, 1906. Serial No. 346,009.

*To all whom it may concern:*

Be it known that I, EDMUND BOURKE McKENNA, residing at Buffalo, in the county of Erie and State of New York, have invented certain new and useful Improvements in Braking Construction, of which the following is a full, clear, and exact description, such as will enable others skilled in the art to which it appertains to make and use the same.

This invention relates to braking apparatus, and with regard to the more specific features thereof to apparatus of this nature used in connection with railway rolling stock.

One of the objects of this invention is to provide efficient and practical braking apparatus wherein the brakes may be applied with any desired degree of force without danger of injury to the wheel.

Another object is to provide apparatus of the above type, of cheap and durable construction, in which the wheel tread and braking surface are independent and each is peculiarly adapted to perform its own functions.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
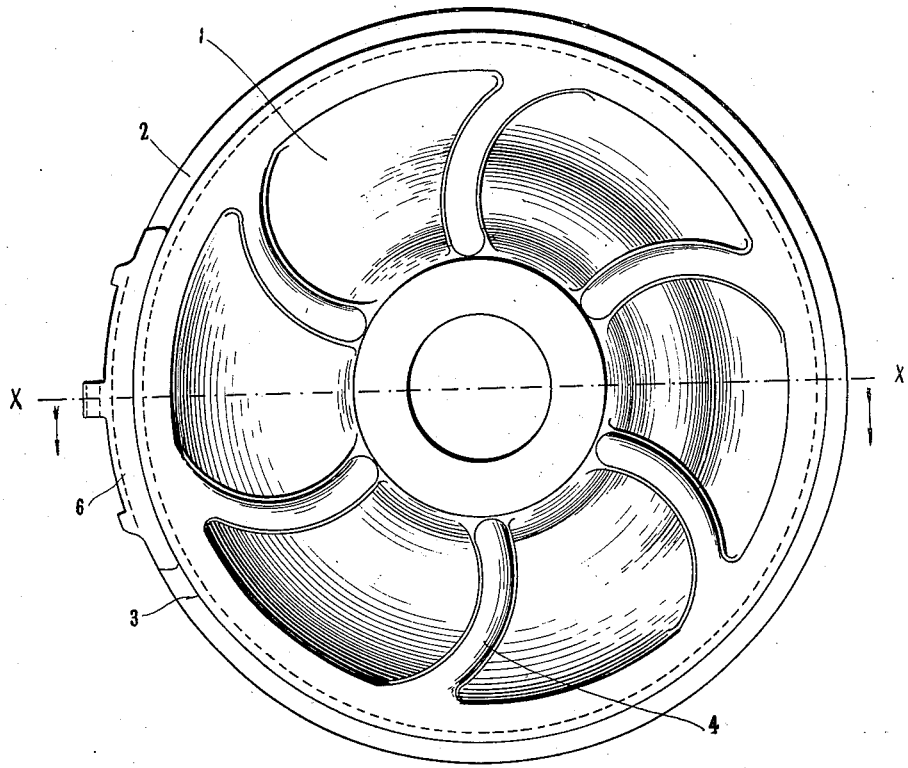
Figure 2:
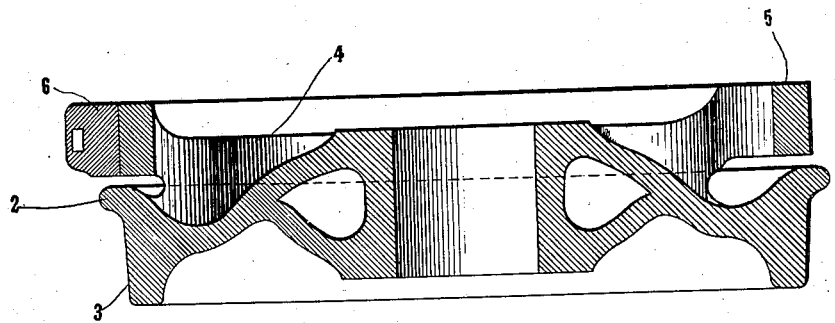

In the accompanying drawing, wherein is shown one of various possible embodiments of my invention, Figure 1 is a side elevation thereof; Fig. 2 is a sectional plan taken on the line $x$—$x$ of Fig. 1.

Similar reference characters refer to similar parts throughout both views of the drawing.

In order that certain features of this invention may be the more readily grasped, it may here be noted that there is a marked tendency in modern railway traffic to the use of heavy rolling stock and high speeds of travel. These factors have brought into general use the employment of heavy braking pressures, with a consequent high degree of friction between the brake shoe and the member with which it coacts. If this braking pressure is brought to bear upon the tread of the wheel, there is a tendency, due to the heat of friction, to expand the metal upon which the braking surface is formed and develop minute cracks therein which in time gradually extend into and reduce the efficiency of, if not completely ruin, the wheel. There is also attendant, in the use of brake shoes upon the tread of a wheel, a considerable wearing away of the wheel tread, with a consequent necessity for frequent truing of this part. If it be attempted to remedy these defects by simply bolting an inner plate to the wheel and bringing the braking pressure to bear upon this plate, it will be found that such an arrangement is insecure and unsafe on account of the great torque which must be borne by the connecting means during the braking of the car. If the braking pressure, moreover, be applied to the wheel outwardly in order to avoid the use of the tread as a braking surface, it is found that the outward thrust is likely to break the wheel or tear the same from the axle. The above and other defects are eliminated and many positive advantages attained in constructions of the nature of that hereinafter described.

Referring now to the accompanying drawing, there is shown a wheel 1 of the cast double-plate type having the customary flange 2 and tread surface 3 formed thereon. On the inner surface of the wheel, it being understood that terms of the nature of "inner" and "inwardly" are used throughout to indicate a direction toward the longitudinal center line of the car, there are formed integral therewith curved arms 4 which terminate at their free ends in an integral braking ring 5. The outer surface of this ring is preferably of the cylindrical form shown, and is adapted to coact with a brake shoe 6 in the well known manner to accomplish the retardation of the car. The outer surface of ring 5 is preferably chilled in order to harden the same, or is otherwise adapted to perform its functions, as by the use of steel inserts to reduce wear.

It may here be noted that the term "offset" is used throughout this specification and the following claims merely to denote a lateral displacement or a positioning of the parts as described in different planes, and that the term "ring" is used in a broad sense as denoting a rotatable member whether circular in form or contour only.

The method of use of the above described embodiment of my invention is substantially as follows: Assuming it to be desired to brake the wheel shown, the brake shoe 6 is thrust against the outer surface of the ring 5 and the retarding tendency exerted thereon transmitted by the integral arms 4 to the wheel 1. Any degree of erosion of the surface of the ring 5 which may occur in practice is permissible without injury to this apparatus, and the results of the friction generated have no deleterious action upon the wheel as a whole. Even though the minute cracks above referred to be developed in the braking ring, it does not prevent this part from still performing its braking function as it is not called upon to bear the load upon the wheel, as is the case with the tread. The latter portion is thus maintained free from wear or the necessity of truing and with the metal in its original condition, and yet is efficiently braked through the ring 5. The heat generated by the friction of braking, moreover, is taken up by the ring and results in an expansion of this part, such action being permitted by the slight springing of the curved arms 4 and spacing of the ring from the wheel body, without bringing internal stresses to bear in the body of the wheel. The braking thrust, moreover, is normal to the wheel, thus being readily taken up thereby and having no tendency to break the wheel or displace it with reference to the axle. The thrust, moreover, exerted by the shoe occurs in a more accurately radial direction than would be possible in the case of the application of a shoe to the wheel tread, inasmuch as the braking surface in the embodiment herein described is substantially parallel to the axle, whereas that of the wheel tread is necessarily somewhat inclined thereto by reason of the slight crowning necessary for the efficient running of the wheel.

It will thus be seen that I have provided apparatus in which the several objects of my invention are achieved and the above enumerated advantages are, among others, present. It may also be noted that by reason of the segregation of the braking surface from the tread of the wheel, the former is adapted to be chilled or otherwise peculiarly adapted for performing its function without necessity for the consideration of the factors which enter into the adaptation of the tread of the wheel for its rolling upon the rail.

The entire device is of simple, cheap and practical construction, and is well adapted to withstand the severe conditions of hard, practical use.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also understood to be that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. In braking apparatus, a car wheel having integral therewith a ring inwardly disposed with reference to the body of the wheel and provided with a cylindrical braking surface, said ring being spaced from the body of the wheel.

2. In braking apparatus, a car wheel having integral therewith a ring offset with respect to the body of the wheel and provided with a braking surface, said ring being spaced from the body of the wheel.

3. In braking apparatus, a car wheel having a ring inwardly disposed with relation to the body of the wheel and spaced therefrom and provided with a cylindrical braking surface.

4. In braking apparatus, a car wheel having a ring offset with respect to the body of the wheel and spaced therefrom and provided with a cylindrical braking surface.

5. In braking apparatus, a car wheel having a ring offset with respect to the body of the wheel and provided with a braking surface, said ring being mounted upon said wheel by arms integral with the ring.

6. In braking apparatus, a car wheel having a ring offset with respect to the body of the wheel and provided with a braking surface, said ring being mounted upon said wheel by arms integral with the wheel body.

7. In braking apparatus, a car wheel having a ring offset with respect to the body of the wheel and provided with a breaking surface, said ring being mounted upon said wheel by arms integral with the ring and with the wheel body.

8. In braking apparatus, a car wheel body, a braking ring, and arms extending from said wheel body to said ring and mounting said ring thereon.

9. In braking apparatus, a car wheel body, a braking ring, and arms extending from said wheel body to said ring and mounting said ring thereon, said ring being provided with a cylindrical braking surface.

10. In braking apparatus, in combination, a car wheel body, a braking ring, and curved arms extending from said body to said ring and mounting said ring thereon.

11. In braking apparatus, in combination, a car wheel body, a braking ring, and curved arms extending from said body to said ring and mounting said ring thereon, said arms being integral with said ring.

12. In braking apparatus, in combination, a car wheel body, a braking ring, and curved arms extending from said body to said ring and mounting said ring thereon, said arms being integral with said wheel body.

13. In braking apparatus, in combination, a car wheel body, a braking ring offset with respect thereto and spaced therefrom, and arms extending from said wheel body to said ring and mounting the same thereon.

14. In braking apparatus, in combination, a car wheel body, a braking ring offset with respect thereto and spaced therefrom, and integral arms extending from said wheel body to said ring and mounting the same thereon.

15. In braking apparatus, a car wheel having integral therewith a ring offset with respect thereto and provided with a chilled braking surface.

16. In braking apparatus, a car wheel having integral therewith a ring offset with respect thereto and provided with a chilled braking surface, said ring being spaced from the wheel body.

17. In braking apparatus, a car wheel having an integral relatively expansible portion provided with a braking surface.

18. In braking apparatus, a car wheel having an integral portion spaced therefrom and provided with a braking surface.

19. In braking apparatus, a double-plate car wheel having a ring cast integral therewith and spaced therefrom, said ring being mounted upon curved arms springing from the inner side of the wheel.

20. In braking apparatus, a double-plate car wheel having a ring cast integral therewith and spaced therefrom, said ring being mounted upon curved arms springing from the inner side of the wheel and provided with a chilled braking surface.

In testimony whereof I affix my signature, in the presence of two witnesses.

EDMUND BOURKE McKENNA.

Witnesses:
PETRE B. SMOKOWSKI,
EDMUND P. COTTLE.